May 6, 1958  J. J. DAILEY ET AL  2,833,603
ARTICLE OF MANUFACTURE
Original Filed June 10, 1954  3 Sheets-Sheet 1

Joseph J. Dailey
John E. Fox
INVENTORS

May 6, 1958  J. J. DAILEY ET AL  2,833,603
ARTICLE OF MANUFACTURE
Original Filed June 10, 1954  3 Sheets-Sheet 2

Joseph J. Dailey
John E. Fox
INVENTORS

BY *(signature)*
Attorney

May 6, 1958 J. J. DAILEY ET AL 2,833,603
ARTICLE OF MANUFACTURE
Original Filed June 10, 1954 3 Sheets-Sheet 3
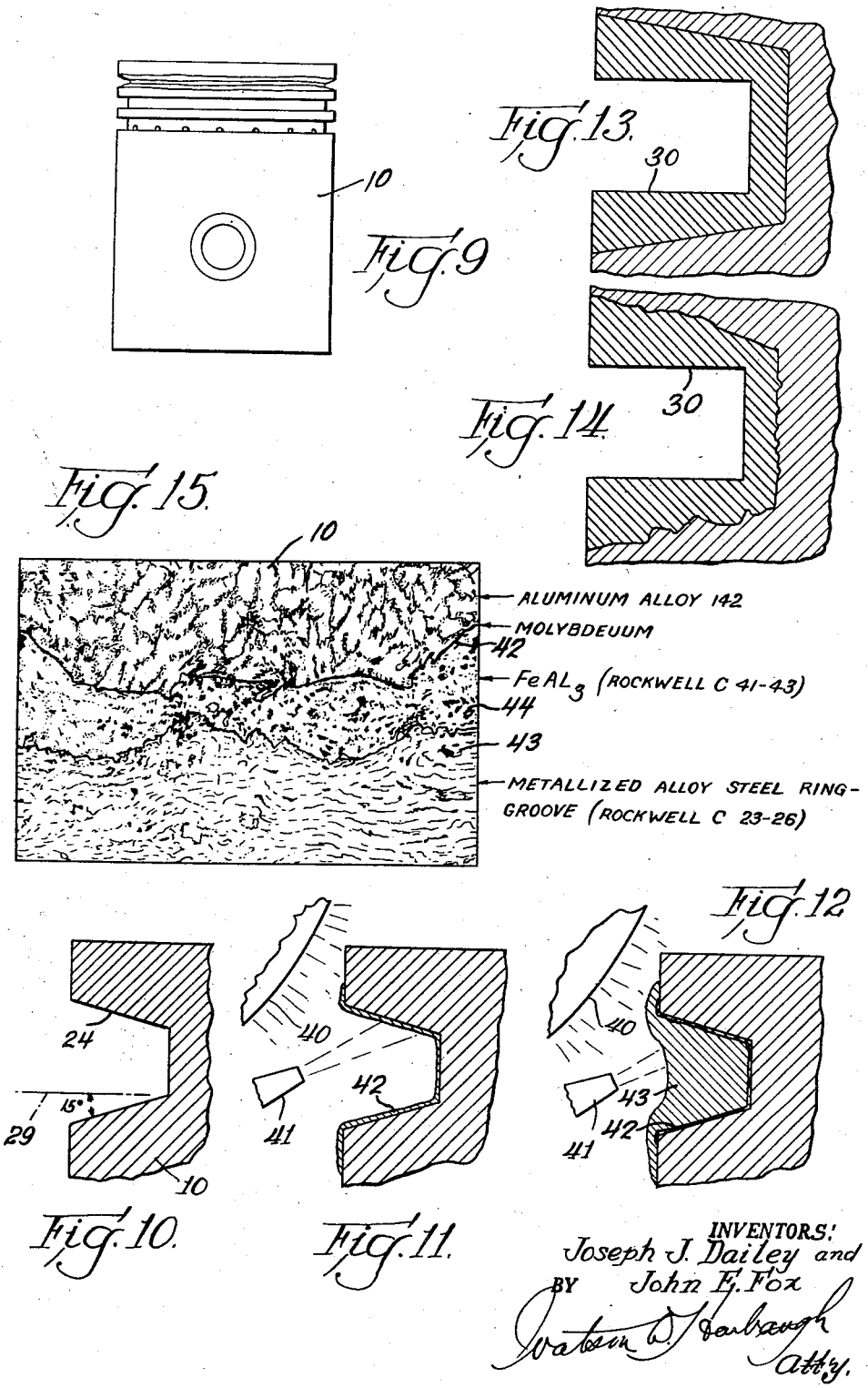
INVENTORS:
Joseph J. Dailey and
BY John E. Fox

United States Patent Office 2,833,603
Patented May 6, 1958

2,833,603

ARTICLE OF MANUFACTURE

Joseph J. Dailey, East Peoria, and John E. Fox, Washington, Ill.

Original application June 10, 1954, Serial No. 435,696. Divided and this application July 31, 1957, Serial No. 679,792

15 Claims. (Cl. 309—14)

The present invention relates to an improved method of bonding two dissimilar metals together and to an improved article such as a piston for internal combustion engines produced in accordance with said method either as an original article of manufacture or as a repaired product.

The present application is a division of our copending application U. S. Serial No. 435,696, filed June 10, 1954.

For purposes of a better understanding of the invention, it is known that outwardly expanding rings of a comparatively hard metal are installed in circumferential grooves cut in the outer surface of pistons used in internal combustion engines. The first one or two rings near the head of the piston are generally referred to as compression rings and serve to block the escape of flame and hot gases developed during the compression and explosion strokes, whereas the rings further down towards the skirt of the piston are oil rings which check the passage of lubricant past the piston during its reciprocation.

Due to the intense heat to which the head of the piston is subjected, the aluminum stock around the compression ring tends to soften enough that between the friction with the cylinder wall resisting reciprocating movement of the compression ring and the inertia of the ring itself resisting reversal of its direction of movement under rapid reciprocation of the piston, the harder metal of piston ring "hammers" against the soft aluminum stock forming the sides of its groove and enlarges the groove. This hammering is further augmented by the gas pressure dynamics acting on the under side of the top ring with a force superior to inertia forces present which causes a ring flutter each expansion stroke. The hammering condition becomes worse and worse as the groove becomes wider and wider.

Endeavors have been made by others as well as ourselves to replace the hammered sides of the compression ring grooves with harder metals that would withstand the hammering of the ring and stay tightly in place only to find that because of different coefficients of expansion, bonding difficulties, etc., the hard metal insert forming the groove works free, starts a hammering action of its own, and multiplies the hammering effect exerted on the aluminum stock.

One of the objects of the present invention is to provide an improved method for bonding an alloy steel such as stainless steel to aluminum or an aluminum alloy.

A further object of the invention is to provide an improved bond between aluminum alloys and steel alloys which withstand hammering under temperatures approaching the annealing point of the aluminum alloy.

Another object of the invention is to provide an improved piston ring supporting groove construction which will stand up under the hammering of the piston ring in engines such as diesel railway engines for a hundred thousand miles or more without need for repair or replacement of the piston.

Another object of this invention is to provide a construction of a piston whereby the latter may be fabricated of aluminum or other light weight material in accordance with conventional practice as often required in high speed engines to reduce piston inertia forces, and yet may have a ring receiving portion of a relatively harder material permanently bonded thereto for minimizing deterioration between the piston rings and the sides of the piston ring grooves of the piston.

A further important object of the invention is to provide an improved and economical method whereby a hardened ring receiving portion may be incorporated in a light weight aluminum piston during the manufacture or repair of the same.

Still another object of the invention is to provide a piston construction whereby a ring receiving portion of relatively harder material may be incorporated in a light weight piston body in an improved manner to provide a thoroughly satisfactorily sealing and retaining means for bonding the harder portion to the piston and to provide for effective heat transfer from the piston body to the rings and from there to the cooled walls of the cylinder.

These, together with various other objects and features of the invention, which will later become apparent as the following description proceeds, are attained by the present invention, a preferred embodiment of which has been illustrated, by way of example only, in the accompanying drawings, wherein.

Figure 3:
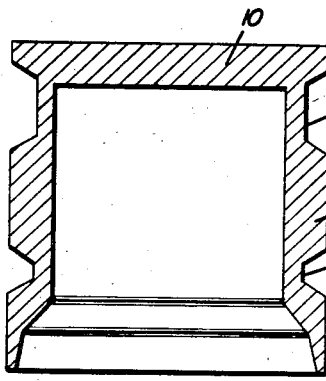
Figure 4:
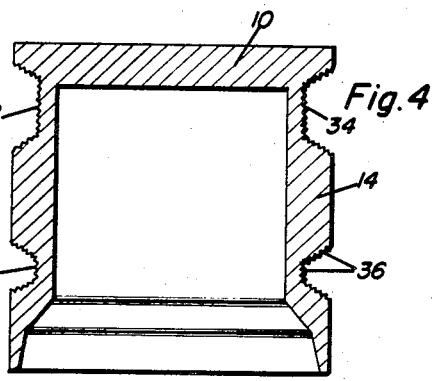
Figure 5:
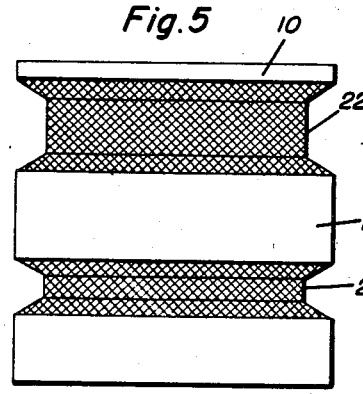
Figure 6:
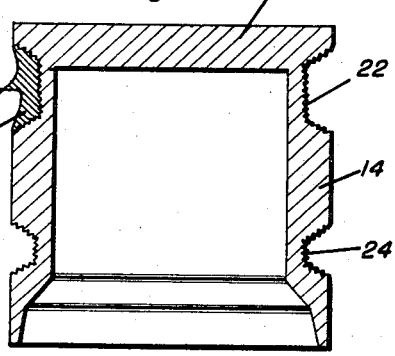
Figure 7:
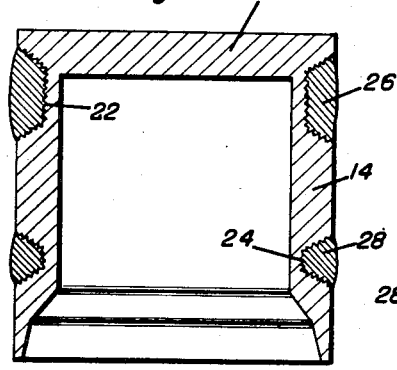
Figure 8:
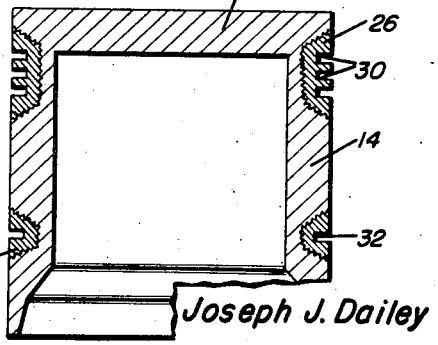

Figs. 3–8 are successive diagrammatic views indicating in vertical central section the various steps in the method by which we construct our improved piston groove assembly; Fig. 3 showing a piston blank which is provided with circumferential channels either as manufactured or prepared for repair; Fig. 4 indicating sectionally such a piston in which the channels have been scored or otherwise roughened if desired; Fig. 5 showing the roughened channels in side elevation after a knurling operation has been performed thereon; Fig. 6 showing the manner in which harder materials are sprayed into and bonded to the knurled channels; Fig. 7 showing the piston at the completion of the spraying operation; and, Fig. 8 showing the outer harder material machined to the circumference of the piston and with the piston ring grooves machined therein ready for the reception of the piston rings and use in an internal combustion engine.

Fig. 9 is a side elevation of a piston showing the construction of the conventional piston ring grooves with the oil return holes in the bottom groove;

Fig. 10 is an enlarged partial section taken of the compression ring groove of the damaged piston machined ready for repair;

Fig. 11 is a view similar to Fig. 10 in which the intermeidate layer of metal is applied;

Fig. 12 is a view similar to Figs. 9 and 10 in which the hard fill metal is applied;

Fig. 13 is a view similar to Figs. 9–12, inclusive, showing th recutting of the piston groove in the hard fill metal;

Fig. 14 is an enlarged view similar to Fig. 13 showing another form the invention wherein the walls of the repair groove had been roughened;

Fig. 15 is a micro photograph showing the respective layers of metal applied in Figs. 11 and 12.

The following abridged table of properties of metals will be helpful in understanding the invention:

|  | Melting Point | Boiling Point | Latent Heat of Vaporization |
|---|---|---|---|
| Molybdenum | 2620° C. | 4803° C. | 177 Cal. gr. |
| Iron | 1535° C. | 2998° C. | 1110 Cal. gr. |
| Aluminum | 657° C. | 2056° C. | 1950 Cal. gr. |
| Titanium | 1800° C. | 5100° C. | 1320 Cal. gr. |

The improved method of bonding two metal masses to each other comprises using an intermediate bonding material whose melting point is preferably above the boiling point of one of the metals bonded and above the melting point of the other metal bonded. The intermediate material is sprayed in molten condition at a temperature above its melting point against said one metal to vaporize a thin outer layer thereof and deposit the sprayed material upon an unoxidized surface. Vaporizing the thin outer layer removes oxides and surface impurities and with the sprayed metal solidifying first some of the vaporized metal condenses and solidifies on the outer surface of the intermediate material. Thereafter spraying the other metal in molten condition on the exposed intermediate material having the condensed metal on its exposed surface, alloys the other metal with the condensed metal to the extent that such is there in quantity, and thereafter the remaining amount of the other metal sprayed on is pure and provides sufficient stock for finishing or machining purposes.

More particularly we have found that by directing molten molybdenum against a body of aluminum warmed preferably by infra red lamps to approximately 450° F., particularly between adjacent walls disposed at an obtuse angle of approximately 100°, a thin layer of molybdenum is deposited that is thoroughly bonded to pure aluminum without an intervening layer of oxidized aluminum. Stainless steel is then sprayed against the molybdenum layer and a layer of substantial thickness of ferrous aluminate appears between the molybdenum and the layer of pure stainless steel. Thus, from the three metals employed, four layers of metal result bonded so intimately that crush tests disclose fractures occurring without respect to interfaces. This bond is established regardless of whether the starting surface is smooth or roughened.

A particular application of this process is made in providing a novel aluminum piston for internal combustion engines in which the piston ring is mounted in a groove cut in a hard metal insert permanently bonded to the aluminum stock of the piston.

Present day internal combustion engines universally employ pistons of an extremely light weight construction such as aluminum, aluminum alloy and the like. This material, while providing an extremely light weight piston, possesses the disadvantage that the material affording the desired lightness is subject to high heat and to a hammering by the relatively harder material of the piston rings disposed in the piston ring grooves of the piston. As a result, numerous disadvantages arise during operation of the engine because of the excessive wear of the piston ring grooves by the very hard material of the piston rings. This is a problem of long standing.

It is the primary and basic purpose of this invention to overcome these disadvantages by incorporating in a light weight piston such as an aluminum piston a hard metal portion containing ring receiving grooves which portion shall be of a relatively harder material than the piston in order to minimize groove wear by the rings; and shall be bonded to the piston in an improved and more secure manner, and shall have a highly desirable high rate of heat transfer from the rings to the body of the piston.

These objects are attained generally by the piston in accordance with the present invention as set forth in the accompanying drawings and in the following description.

Reference is now made specifically to the drawings wherein like numerals designate similar parts throughout the various views. The numeral 10 designates generally any conventional form of light weight piston such as one made of aluminum, an alloy or the like. The piston is provided with a customary head portion 12 and skirt portion 14 together with bosses 16 disposed diametrically opposite each other for receiving the conventional wrist pin or piston pin by which the piston rod or connecting rod (not shown) is secured to the piston and attaches the latter to the crankshaft of the engine when the piston is in working position in a cylinder.

The compression rings are indicated at 18 which serve to prevent escape of the pressure of the exploded gases between the piston and the wall of the cylinder, while the oil ring is indicated at 20 to prevent escape of oil upwardly past the piston and into the combustion chamber of the cylinder.

Figure 1:
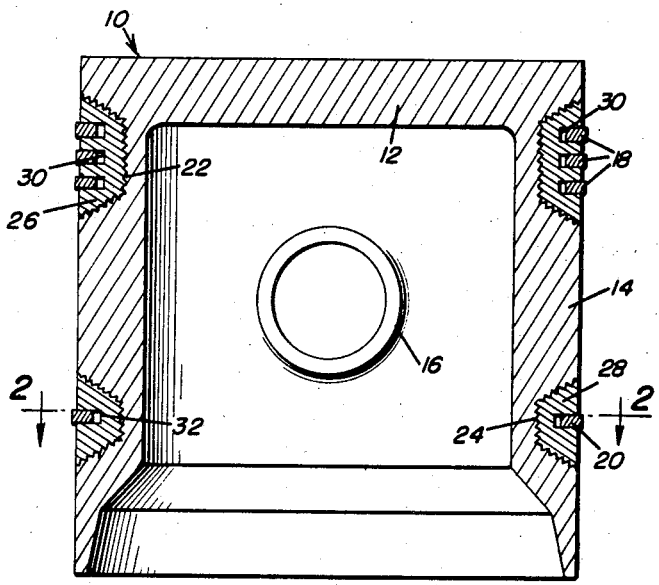
Fig. 1 is a vertical sectional view through a piston having the hardened ring receiving portions combined therewith in accordance with the principles of this invention.
Figure 2:
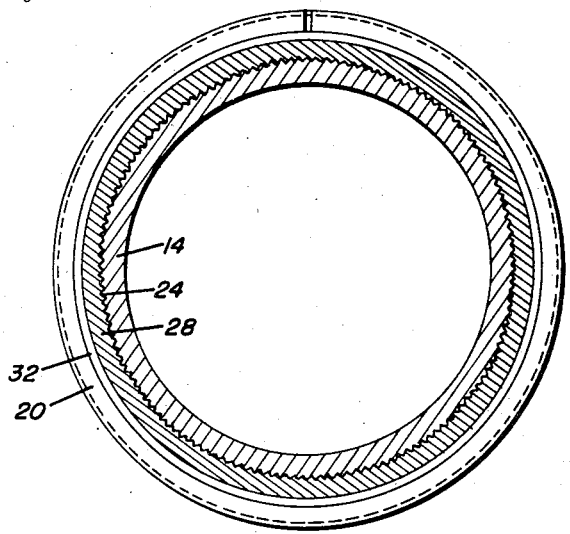
Fig. 2 is a horizontal sectional view taken substantially upon the plane indicated by the section line 2—2 of Fig. 1.

Referring now particularly to Fig. 1, it will be seen that there is provided a circumferential groove or channel 22 extending about the upper portion of the piston just below the piston head, this channel having outwardly diverging side walls. A similar channel 24 can be provided circumferentially about the exterior surface of the bottom portion of the piston skirt 14. The relative inclination of the walls of the channels is approximately 15° as indicated in Fig. 10 from a line 29 perpendicular in side elevation to the bottom of the groove 22 or 24. This tends to huddle the sprayed material and provide the best angle for the interfaces under relative heat expansion.

In applying the metals as described, the piston chemically cleaned is preferably mounted on a turntable or lathe (not shown) with infra red lamps 40 directed against the piston 10 to bring the temperature of the entire body up to approximately 450° F., its expected working temperature. This vaporizes moisture and any cleaning fluid that may remain and heat expands the aluminum to its normal working expansion. A conventional metallizer or metal spraying gun 41 is loaded with molybdenum and sprayed into the groove as at 42 to a depth of .0015–.003 of an inch at a temperature well above its melting point. Then preferably a stainless steel having high chrome content and some nickel is loaded in the gun and as shown in Fig. 12 the groove is filled as at 43 with some overspray along the sides. Thereafter the overspray is ground off to the diameter of the piston preferably under coolant and the groove 30 cut by carbide tools under suitable coolant.

Vaporization of the oxidized surface of the aluminum places the molybdenum in intimate bonded relationship with unoxidized aluminum stock, the vaporized aluminum forming a temporary but protective atmosphere until the molybdenum begins to solidify and since aluminum has the lower melting point, the vapor aluminum solidifies subsequently on top of the molybdenum. Thereafter the solidified aluminum is brought to a molten state to alloy with the first layers of the stainless steel being sprayed on in the next step. This diffusion develops a layer of ferrous aluminate 44 which bonds well with the molybdenum and with the steel that is being applied. After there is no more aluminum to alloy it, the stainless steel 43 applied is pure. This provides a very effective bond that affords good heat exchange and an enduring groove for long periods of piston use.

As illustrated, several compression rings 18 are received in individual grooves cut in a single annular body portion 26 of hard material, while a single oil seal ring 20 is shown carried by a lower body portion 28 in the channel 24. Various other arrangements of rings are possible. A single fill and channel can be provided for each ring or any other desired number of rings may be carried by channels formed in a single body portion of any desired dimension.

After the hard material 26 and 28 is secured in the channels 22 and 24, the material so applied to the piston is machined so as to provide a smooth cylindrical surface of the hardened portion which is flush and co-terminus with the skirt of the piston. This material is then machined with grooves 30 to receive the piston rings 18, or at 32 to receive the piston rings 20.

A further and satisfactory method for preparing the piston body before applying the hard material is depicted in Figs. 3–8.

In Fig. 3, there is shown the piston 10 after the wall 14 thereof has been grooved to provide the upper and lower channels 22 and 24 for receiving the compression and oil rings respectively. These chanels could be fabricated in the piston during their casting, or machined therein in any desired manner after the casting has been completed. In any event, the exposed surface portions 34 in the channels 22 and 36 in the channel 24 are roughened or serrated on both the bottom walls and the side walls of the channels. These serrations provide a large number of points and irregular portions which are adapted to intimately engage the material of the hardened portions for interlocking as well as bonding the same to the pistons. As shown in the elevational view of Fig. 5, the serrated portions of the channels may be formed by knurling the surface of the walls and bottom of the channels or in any other desired manner.

After the serrated portions are formed in the channels, molten molybdenum and stainless steel are sprayed successively into the channels as already described. Here again, after the spraying operation is completed, as shown in Fig. 7, the hardened body portions 26 and 28 will not only fill the channels 22 and 24 but will extend annularly and laterally therefrom to be ground off and machined as already described to provide ring grooves.

Upon the completion of the process, it will therefore be apparent that the hard materials are intimately bonded in both secure mechanical and efficient heat transmitting relation to the heat conducting walls of the aluminum or other light weight piston. There is thus provided a wearing surface which is capable of withstanding the hammering of the hard piston rings, without sacrificing the advantages of the light weight aluminum piston.

In some respects we are not able to account fully for the improved results attained and the relationship of elements established by the method and product of this invention, and it should be understood that any attempt to analyze the theory which is believed to be responsible for these results is to be construed not as defining a mode of operation but merely as a possible explanation of certain physical phenomena which have been observed. For instance, although the presence of the layer of ferrous aluminate is believed to come from precipitation of the vaporized aluminum on the molybdenum when the molybdenum is applied, its presence, aside from being apparently of benefit in the bonding, indicates that the molybdenum is bonded with pure aluminum. This is borne out by Fig. 15. There is no layer of aluminum oxide between the aluminum and molybdenum. The precipitation can be removed, if desired, before the stainless steel is applied and an excellent bonding relationship can be accomplished with the pure stainless steel on the molybdenum but the presence of the ferrous aluminate is preferred to pair with the aluminum as alternate layers of metals having substantially the same coefficient of heat expansion.

Then too, titanium, having a high boiling point, can be used also as an intermediate material in an oxygen free atmosphere. Consequently, the high melting points and boiling points of these two metals indicate that there is sufficient heat present to vaporize the aluminum which does not begin to precipitate until after the molybdenum or titanium begins to solidify and bond with the pure aluminum, thus assuring a bond between pure metals without contamination by the aluminum oxide. In fact, it can be expected that since the aluminum is melting and vaporizing just prior to the time the molybdenum begins to set and after a turbulent spraying application, the purity of the aluminum bonding to the molybdenum is assured even to a mixture of the molecules at the interface.

The intensity of the molecular action at the interfaces can be appreciated when it is noted that the boiling point of aluminum is 2056° C. and the latent heat of vaporization requiring further calories is 1950 Cal./gr., and the boiling point of stainless steel is over 2998° C. The use of molybdenum, which melts at 2620° C. and is molten (non-gaseous) up to 4803° C. (titanium to 5100° C.), indicates the range of heat that can be applied to assure vaporization of the surface of the aluminum. The converse is equally advantageous because the high latent heat of vaporization requirements of the aluminum prevents too much vaporization of aluminum and also rapidly cools the molybdenum below its melting point at the interface so that the application, vaporization and cooling occurring is substantially instantaneous above the approximate temperature of 2620° C. and the molybdenum solidifies before the aluminum does at the interface. Thereby the harder metal is accommodated at the interface bonding by the aluminum solidifying subsequently at less than 657° C.

The stainless steel then melts the aluminum precipitate above 1535° C. but below 2998° C., and the molecular activity results in ferrous aluminate if the aluminum has not been removed, and the bonding is completed.

Other metals also could serve as the intermediate material if their boiling point is high enough that aluminum is vaporized preferably without the metal reaching its own boiling point. Cobalt and nickel could be used in this connection under carefully controlled temperature conditions, the calories per gram ratio between the metals being important. There should be enough calories present in the applied metal below its boiling point to cause some vaporization of the base metal at its surface.

We have found, however, that molybdenum gives the best results because some leeway is permitted in the distance between the nozzle of the metal spray gun and the work in order to control with predictability the vaporization and the resulting Brinell of the metal. For the filling metal a 3½" spacing gives the best degree of hardness which should be within the range or Rockwell C 23 to 26 for grinding and groove cutting operations.

From the foregoing it will be seen how the various objects of the invention are accomplished and how various and further changes and modifications can be made without departing from the spirit of the invention, the scope of which is commensurate with the appended claims.

This application is a continuation-in-part application of our earlier filed application, Serial No. 392,164.

What is claimed is:

1. An article of manufacture comprising a body made of a metal containing aluminum, a coating of laminated particles of metal containing molybdenum whose innermost face is molecularly mixed with unoxidized metal at the surface of said body, a ferrous aluminate layer bonded to the outermost face of said coating, and a stock of stainless steel bonded to said layer.

2. A piston body for internal combustion engines made of a metal containing aluminum and having a circumferential contour in the outer wall thereof which includes a channel filled with metal, said channel being characterized by axial side walls inclined outwardly away from each other at approximately an angle of 30°, and said metal filling said channel including layers of laminated metal particles intimately contacting unoxidized metal in the walls of said channel, the metal of said particles having a caloric content rating when its temperature approaches its boiling point which is above the boiling point of said metal containing aluminum, and a ferrous metal bonded to the outermost layer of metal particles having a melting point above 657° C., said ferrous metal having a groove for receiving a piston ring therein.

3. A light weight piston including a skirt made of light metal, an annular portion embedded in said skirt of a metal comprising a metal selected from a group consisting of molybdenum, titanium, cobalt and nickel, said annular portion constituting laminated layers of particles whose innermost faces are intimately bonded to the light metal of the piston skirt in unoxidized metal to metal good heat exchange contact therewith, said annular portion having a circumferentially disposed ring receiving groove therein.

4. A light weight piston including a skirit, an annular portion embedded in said skirt and of a material which is relatively harder than that of the piston skirt, said annular portion being intimately bonded to the material of the piston skirt by intermediate film layers of laminated particles of molybdenum whose innermost face is in unoxidized metal to metal surface to surface contact with said material, said annular portion having a circumferential ring receiving groove therein.

5. A light weight piston made of aluminum alloy including a skirt, an annular portion mounted upon said skirt and of a material which is relatively harder than the aluminum alloy of the piston skirt, said annular portion being intimately bonded to the material of the piston skirt within the circumference thereof by laminated layers of particles of the metal whose melting point is above the boiling point of aluminum disposed in unoxidized metal to metal intimate contact with the aluminum alloy, said annular portion having a circumferential ring receiving groove therein.

6. A light weight piston including a metal skirt, an annular portion embedded in said skirt including a material whose melting point is above the boiling point of the skirt metal, said material and skirt metal being intimately bonded in unoxidized metal to metal contact at their interface and in good heat exchange relation therebetween, said annular portion having circumferential ring receiving grooves therein.

7. A light weight piston including a skirt of light metal having a circumferential channel with divergent side walls, an annular portion received in said channel upon said skirt comprising a material taken from a group consisting of molybdenum, titanium, cobalt and nickel, disposed in intimate face to face unoxidized metal to metal contact with the light metal and in good heat exchange relation therewith, said annular portion having a circumferential ring receiving groove therein.

8. A light weight piston including a skirt, an annular portion mounted upon said skirt of a material which is relatively harder than that of the piston skirt, said annular portion and the material of the piston skirt having an interface of an intimate admixture of particles of the respective materials in unoxidized face to face contact with each other in a uniform dispersion providing good heat exchange relation therebetween, said annular portion having a circumferential ring receiving groove therein, and having its exterior surface flush with that of the piston skirt.

9. A light weight body including a member of light metal, an annular portion mounted upon said member and of a material which is relatively harder than that of the member, said annular portion being intimately bonded to the light metal of the member and in good heat exchange therewith, said annular portion providing laminated particles at its innermost surface dispersed in uniform ration in intimate contact with unoxidized particles of light metal at the interface.

10. A light weight piston including a skirt of light weight metal having a circumferential channel, an annular portion mounted upon said skirt in said channel including a material which has a melting point above the boiling point of the light weight metal of the piston skirt, said annular portion comprising laminated particles intimately contacting unoxidized light weight metal of the piston skirt and in good heat exchange relation therewith at the interface therebetween with a uniform dispersion of said particles at the interface, said annular portion having circumferential ring receiving grooves therein.

11. An aluminum piston including a skirt having a circumferential channel with a serrated surface, an annular portion mounted upon said skirt in said channel of laminated particles of a material which is relatively harder than the aluminum of the piston skirt, said particles being disposed in intimately bonded unoxidized metal to metal contact with the aluminum of the piston skirt and in good heat exchange relation therewith, said annular portion having circumferential ring receiving grooves therein and being penetrated along an interface by portions of said serrated surface in interlocking relationship.

12. A light weight piston including a skirt of light weight metal, an annular portion mounted upon said skirt and of a material which is relatively harder than said light weight metal, said annular portion being intimately bonded to the light weight metal and in good heat exchange relation therewith, said annular portion having a circumferential ring receiving groove therein, said piston skirt having a circumferential channel receiving said annular portion, said channel having divergent side walls, said side walls being serrated and intimately bonded to and penetrating in a particularized dispersion the material of said annular portion, said annular body being composed of laminated particles in intimate contact with unoxidized light weight metal at the interface between the annular body and light weight metal.

13. A light weight piston including a skirt of aluminum material defining a circumferential channel therein, an annular portion of harder material including particles of molybdenum within said channel intermixed with unoxidized aluminum at the interface between said annular portion and said skirt in an intimately uniform dispersion of the intermixed molecules of aluminum and molybdenum.

14. A light weight piston including a skirt of aluminum material defining a circumferential channel therein, an annular portion of ferrous material within said channel including laminated particles of metal containing molybdenum at the interface between said annular portion and said skirt characterized by an intimately uniform dispersion of the particles in the aluminum in unoxidized metal to metal contact therewith of high heat conductivity at the interface.

15. A light weight piston including a portion of a metal containing aluminum and defining a circumferential channel therein, an annular portion of ferrous material supported in said channel including laminated particles of material metal taken from the group consisting of molybdenum, titanium, cobalt and nickel whose innermost surfaces are intimately bonded in unoxidized metal to metal contact with the metal of said piston portion within said channel and the interface between said annular portion and said piston portion includes an intimately uniform dispersion of the contacting metals and said particles having a substantially uniform occurrence in each arbitrarily small neighborhood of the interface and joined at outer electron rings of at least one of the atom constituents thereof by an atomic bond providing an interlaced web at the interface of cohesive strength representing a significant multiple of the cohesive strength otherwise available.

References Cited in the file of this patent

UNITED STATES PATENTS

| 1,947,493 | Rose et al. | Feb. 20, 1934 |
| 2,588,421 | Shepard | Mar. 11, 1952 |
| 2,620,530 | Sulprizio | Dec. 9, 1952 |

FOREIGN PATENTS

| 642,042 | Great Britain | Aug. 23, 1950 |
| 834,793 | Germany | Mar. 24, 1952 |